Oct. 6, 1964    H. L. DOBRIKIN ETAL    3,151,525
BRAKE ACTUATOR AND SETTING MEANS THEREFOR
Filed Feb. 28, 1963
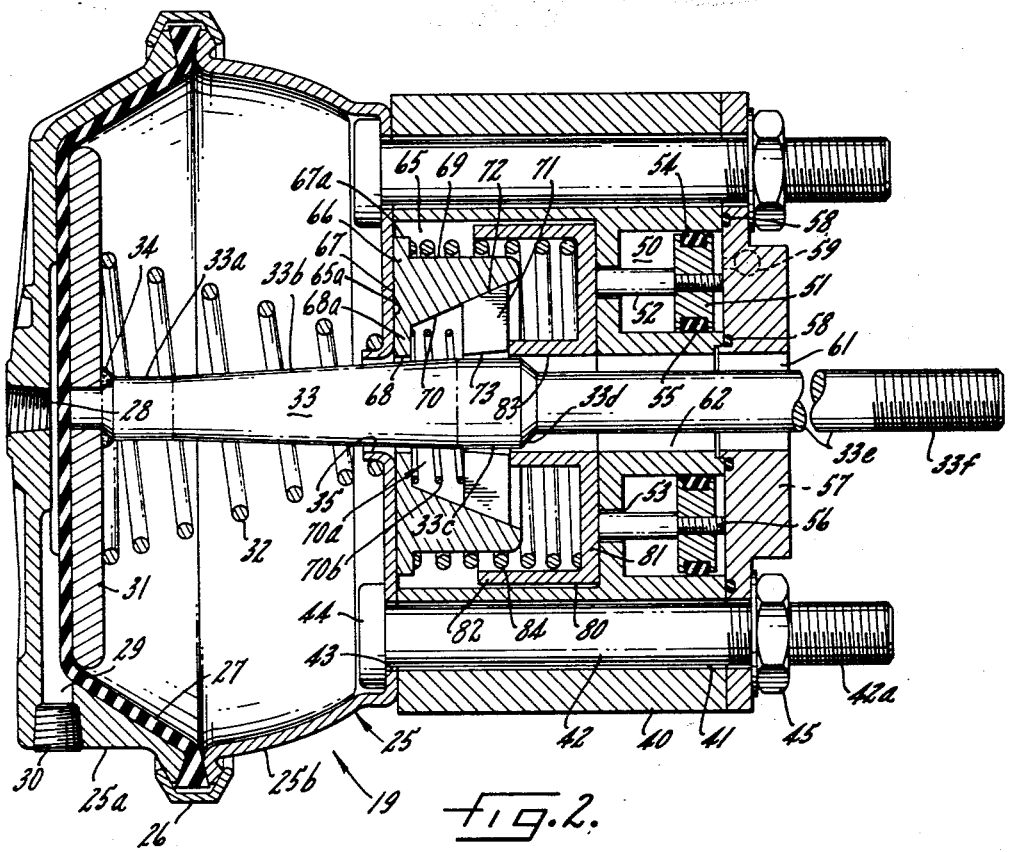
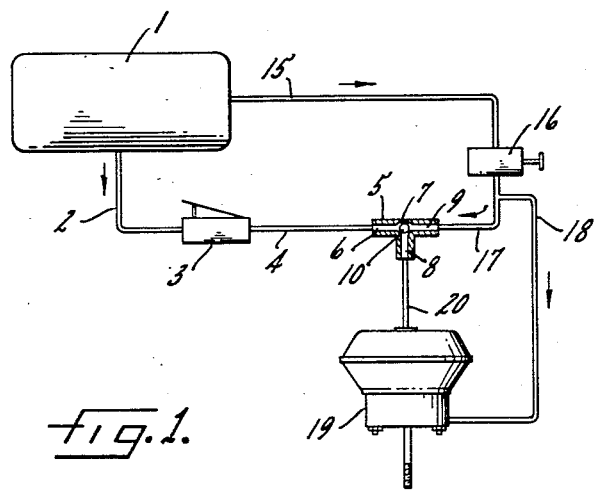
INVENTORS.
HAROLD L. DOBRIKIN
CHARLES HOROWITZ
BY
Parker & Carter
ATTORNEYS.

United States Patent Office 3,151,525
Patented Oct. 6, 1964

3,151,525
BRAKE ACTUATOR AND SETTING MEANS THEREFOR
Harold L. Dobrikin, Highland Park, and Charles Horo-
witz, Chicago, Ill., assignors to Berg Airlectro Products
Co., Chicago, Ill., a corporation of Illinois
Filed Feb. 28, 1963, Ser. No. 261,604
9 Claims. (Cl. 92—24)

This invention relates to brake actuators and has particular relation to a brake actuator for truck-trailer combination vehicles and the like.

One purpose of the invention is to provide a brake actuator having means for locking the same in brakes-on position.

Another purpose is to provide a brake actuator which may be employed for normal brake operation and for setting the vehicle brakes in brakes-on configuration.

Another purpose is to provide a brake system having means for normal operation and for setting a vehicle brake system in brakes-on configuration.

Another purpose is to provide a fluid pressure vehicle brake system having alternate means for actuating the brakes thereof.

Another purpose is to provide a brake actuator having means for normal brake operation and fluid pressure operated means for setting said brake operating elements in brakes-on position.

Another purpose is to provide a brake actuator assembly having means responsive to the presence of fluid pressure for retaining the brakes in brakes-on configuration.

Another purpose is to provide a brake actuator having fluid pressure means for operating the same to apply a brake and means for locking said application means in brakes-on position and for retaining the same in said position in the absence of normal brake-operating fluid pressure.

Another purpose is to provide an actuator having means for operating the same in response to service pressure and means for locking the same in brakes-on position in response to parking fluid pressure.

Another purpose is to provide a brake actuator having self-centering means for locking the same.

Another purpose is to provide a brake actuator having relatively free floating means for locking the same.

Another purpose is to provide a brake actuator operable selectively by service pressure and by parking pressure.

Another purpose is to provide a brake actuator having means for operating the same selectively by service fluid pressure and by parking fluid pressure, said means including locking means effective automatically to lock said actuator in brakes-on configuration when said brake is operated by parking fluid pressure.

Other purposes will appear from time to time during the course of the specification and claims.

The invention is illustrated more or less diagrammatically in the accompanying drawings, wherein:

FIGURE 1 is a schematic view illustrating a fluid pressure brake system of the invention; and FIGURE 2 is a side elevation in partial cross section and illustrating the actuator of the invention.

Like parts are indicated by like numerals throughout the specification and drawings.

Referring now to the drawings, and particularly to FIGURE 1, the numeral 1 generally designates a source of fluid pressure which may take the form of the reservoir illustrated. While a single reservoir 1 is shown in FIGURE 1, it will be understood that the source of fluid pressure herein may be composed of more than one reservoir and may, for example, include a service reservoir, an emergency reservoir and, on occasion, a third reservoir. Similarly, the source of fluid pressure may include what is known as a "protected" tank wherein a check valve or series of check valves insures against a loss of fluid pressure from said tank and means are provided for interposing said tank in the system as required.

From the source 1 a conduit 2 leads to an application valve 3. The application valve 3 may take any suitable form, as is well known, and it will be understood that the valve 3 is operated by the vehicle operator, normally by foot pressure. From the application valve 3 a conduit 4 communicates with a two-way check valve 5. The check valve 5, generally T-shaped in overall configuration, has an inlet passage 6 communicating with conduit 4 and with a central chamber 7. An outlet passage 8 communicates with the chamber 7 and a second inlet passage 9 also communicates, at a point diametriacly opposed from the inlet 6, with the chamber 7. A check valve member 10 is carried in chamber 7. It will be realized that fluid pressure entering inlet 6 moves member 10 into sealing contact with inlet 9 and opens communication between inlet 6 and outlet 8. Conversely, fluid pressure entering inlet 9 moves valve 10 into sealing engagement with inlet 6 and opens communication between inlet 9 and outlet 8.

A conduit 15 leads from a source of fluid pressure, such as the source 1, to a manually operable parking valve 16. From the parking valve 16 a conduit 17 leads to and communicates with inlet 9 in check valve 5. A branch conduit 18 communicates with the conduit 17 and with one end of a brake actuator 19. Similarly, the outlet 8 is in communication with another portion of actuator 19 as by conduit 20.

prises a housing generally indicated by the numeral 25. The housing 25 may be formed by a pair of shell-like members 25a, 25b. The shells 25a, 25b have peripheral flanges at their open ends and a ring clamp 26 serves to clamp the flanges, with a peripheral portion of a diaphragm 27 therebetween. The diaphragm 27 divides housing 25. A fluid pressure inlet 28 is formed in an end wall of housing 25 on one side of diaphragm 27 and is arranged for communication with conduit 20 to supply fluid pressure to that side of diaphragm 27. An alternate inlet 29 is formed in housing portion 25a for delivery of fluid pressure to said side of diaphragm 27. It will be noted that the passage 29 is shown as capped off or plugged, as indicated at 30. Since the two-way check valve 5 is employed, as shown in FIGURE 1, alternate fluid pressures may be delivered at inlet 28. It will be understood, however, that the conduit 4 could communicate with inlet 28 and, if desired, the conduit 17 could communicate with passage 29 without departing from the nature and scope of the invention.

A pad 31 is held against the side of diaphragm 27 opposite that side to which fluid pressure is delivered, by a yielding member such as the spring 32. An actuating rod 33 is secured to pad 31, as indicated at 34, and extends through an aperture 35 formed in the end wall of housing part 25b. It will be observed that the aperture 35 is of a diameter larger than any diameter of rod 33 movable therethrough and that no seal is required between aperture 35 and rod 33. Rod 33 has a circumferential portion 33a adjacent pad 31, an outwardly tapered continuing portion 33b joining portion 33a and terminating at a point outwardly of housing 25 at all times, even when the pad 31 is at its innermost position to which it is urged by the spring 32 as shown in FIGURE 2. The outwardly tapered portion 33b is joined by a second cylindrical portion 33c, the diameter of which is, of course, substantially greater than that of rod portion 33a. An inwardly conical portion 33d joins circumferential portion 33c and a reduced, circumferential, elongated portion 33e on rod 33. The outer end portion of rod 33 may be threaded, as indicated at 33f, or otherwise formed for engagement with elements (not shown) of the brake to be operated by the actuator 19.

While the entire enclosing structure illustrated in FIGURE 2 may be considered as a housing, for convenience a portion 40 is described as a subhousing. The subhousing 40 has a plurality of parallel apertures or passages such as that shown at 41. Since these are identical, description of one shall suffice for description of all such passages. These are circumferentially spaced in subhousing 40 for reception of fasteners, such as the bolts 42. The bolts 42 extend through circumferentially spaced apertures, such as that shown at 43, in the end wall of housing part 25b. The bolts 42 have heads or enlargements 44 positioned inside housing part 25b and extend through and outwardly of subhousing 40 for reception of nuts 45. It will be understood that the outwardly extending threaded ends 42a of bolts 42 may be employed for attachment of the entire actuator 19 to suitable brackets on the vehicle with which the actuator is associated.

Within subhousing 40, adjacent one end thereof, there is formed an annular chamber 50 in which an annular piston 51 is reciprocal. The piston 51 has a plurality of circumferentially spaced legs or thrust members 52. Each of the legs 52 extends through an associated aperture 53 formed in the bottom wall defining chamber 50. The piston 51 carries an outer seal 54 engaging the inner circumferential surface of the outer wall of chamber 50 and a second seal 55 engaging the circumferential surface of the inner wall forming chamber 50. The piston 51 has a series of abutment members 56 circumferentially spaced thereon and extending from the surface of piston 51 opposite that from which the legs 52 extend for engagement with the inner surface of a cap 57 which seats upon the subhousing 40 and serves to define the chamber 50. Seals 58 seal the engagement of cap 57 with subhousing 40 and thus seal the annular fluid pressure chamber 50. A fluid pressure inlet 59 is shown in dotted lines in FIGURE 2 and is arranged for delivery of fluid pressure to chamber 50 on that side of piston 51 opposite that from which the legs 52 extend. The members 56 serve to space the piston 51 from the cap 57 and thus to insure against sealing off the inlet 59. The cap 57 is centrally apertured as at 61 and the inner wall defining annular chamber 50 is hollow, as indicated at 62, to provide for the excursion of rod 33 therethrough.

On the opposite side of chamber 50 from cap 57 a second chamber 65 is formed in subhousing 40. The chamber 65 has an inner end wall 65a formed by the outer surface of the circular end wall of housing portion 25b in which aperture 35 is centrally positioned. About the aperture 35 and freely floating upon the outer surface of the end wall 65a is a circumferential guide anvil or die member 66. The die member 66 has a flat end wall surface 67 riding upon the outer surface of the wall 65a. The end surface 67 is centrally apertured, as indicated at 68, for extension therethrough of rod 33. The aperture 68 has a diameter substantially equal to that of aperture 35 and the aperture 68 is substantially coaxial with the aperture 35 although the freely floating nature of member 66 may permit slight variances in axial alignment therebetween. The member 66 has a generally circumferential outer wall surface 69 and an outwardly diverging conical inner wall surface 70. The wall 70 forms a generally conical well 70a. An outer annular flange 67a bounds the anvil surface 67 and an inner annular flange 68a bounds aperture 68.

Positioned within the well 70a is a plurality of circumferentially disposed locking wedges such as that indicated at 71. Since the wedges are identical, it will suffice to describe one of said wedges. The wedge 71 has an outwardly conical end surface 72 matching and slidable upon the inner wall 70 of member 66. Each of the wedges 71 has an inner wall surface 73 which is tapered inwardly in the direction of aperture 68, for example, at a suitable angle. It has been found that an angle of 3 degrees on surface 73 and a corresponding angle of 3 degrees on the surface of tapered portion 33b of rod 33 has proved suitable. The wedges 71 may conveniently be four in number and may, in such instances, comprise approximate quadrants or quarter-sections of a circle in planar configuration. A spring 70b may, if desired, be arranged to seat on flange 68a and to urge wedges 71 toward the open end of well 70a and thus away from engagement with rod 33.

A circumferential thrust member 80 has an annular end wall 81 positioned for engagement by legs 52, an outer circumferential wall 82 slidable in chamber 68 and a central sleeve portion 83 positioned to engage all of the wedges 71. A yielding member, such as the spring 84, seats within the member 80 and engages flange 67a of member 66 to urge the member 80 toward the chamber 50.

The use and operation of the invention are as follows:

When the vehicle operator actuates, as by foot pressure, the application valve 3, service fluid pressure is delivered at inlet 28. Said pressure produces a movement of the diaphragm 27, pad 31 and rod 33 outwardly of actuator 19, or to the right as the parts are shown in FIGURE 2. Such movement of rod 33 is effective to apply the brakes. In normal operation, upon relaxation or diminution of pressure at inlet 28, as when the operator releases application valve 3 and the same is exhausted to atmosphere, the spring 32 is effective to return the parts, in the absence of fluid pressure at inlet 28, to the position shown in FIGURE 2. Thus the structure of the invention is fully operable in normal routine service brake application. Since peculiarities of assembly, attachment, wear and so on may produce a slight variance in the axial disposition of rod 33, it will be observed that substantial space has been provided at openings 61, 62 and 35 and 68 to permit such variance. There are no seals on rod 33 and rod 33 is thus completely free to move in its excursion in response to service pressure at inlet 28 as just described.

When the operator chooses to park the vehicle, however, and thus to apply and set the brakes of the vehicle for parking purposes, it is only necessary that the vehicle operator actuate parking valve 16. Such actuation produces fluid pressure at inlet 28 or, alternatively, when the two-way check valve 5 is not employed, at inlet 29. Thus parking fluid pressure is delivered to the diaphragm 27 in the same manner as above described with respect to inlet 28 and service fluid pressure. In response to such delivery the pad 31 and rod 33 are moved toward brakes-on position or to the right as the parts are shown in FIGURE 2 as above described. However, when the parking valve 16 is actuated, fluid pressure is delivered not only through conduit 17 to the diaphragm 27 as above described, but fluid pressure is also delivered through conduit 18 to inlet 59 in subhousing 40. Fluid pressure entering chamber 50 through inlet 59 is delivered to the annular piston 51 and the same moves in response to such fluid pressure toward the housing portion 25 or to the left, as the parts are shown in FIGURE 2. Movement of piston 51 under the urging of fluid pressure in chamber 50 causes movement of the wedges 71, through the mediacy of legs 52 and sleeve 83 of member 80, inwardly into well 70a of the member 66. Since the inner wall 70 of said well 70a is inwardly conical and the corresponding outer surfaces of wedges 71 slidably engage the wall 70, such movement, against the action of spring 84, is effective to move the wedge members 71 radially inwardly toward rod 33. It will be noted that the inlet 59 is substantially restricted relative to the size of the inlets 28 or 29 and that fluid pressure entering chamber 50 will thus be slower in reaching predetermined amounts than that entering inlets 28 or 29. Hence the rod 33 will have moved into its brakes-on position, or to the right as the parts are shown in the drawings, prior to the movement of wedges radially inwardly theretoward. Since the member 66 is freely floating on the outer surface of housing portion 25b, the wedges 71 as they move inwardly toward the rod 33 may seek their own best position. Thus the conical inner wall surface 73 of each of the wedges 71 is brought into engagement with the tapered outer surface of portion 33b of rod 33 when the rod 33 is in brakes-on position. Since brakes-on position may vary, due to installation tolerances, wear of brakes, etc., it will be seen that wedges 71 can lock rod 33 at a plurality of points along its extended tapered portion 33b. With rod 33 in its full brakes-off position, as shown in FIGURE 2, however, the circumferential rod portion 33c is aligned with wedges 71 and rod 33 cannot, therefore, be locked in brakes-off position.

So long as fluid pressure remains in chamber 50, between piston 51 and cap 57, therefore, the wedges 71 lockingly engage the tapered portion 33b of rod 33 and the actuator is held in brakes-on position and said brakes are mechanically locked and cannot be released. Even if fluid pressure should, by leakage or otherwise, escape from chamber 50, resulting in a movement of piston 51, legs 52 and member 80 toward the release position as illustrated in FIGURE 2, in response to spring 84, it will be seen that the wedges 71 will remain in locked engagement with the rod portion 33b.

Should it be considered desirable, a light spring or other yielding member 70b may be positioned in the well 70a between wedges 71 and the inner base flange 68a of said well. Such a member would tend to move the wedges 71 out of engagement with the rod 33 when fluid pressure is released from chamber 50. Whether spring 70b be present or not, however, spring 32 is effective to hold rod 33 locked against wedges 71 in well 70a when pressure is released from chamber 50.

Release of the brakes of the vehicle may be accomplished by a single and simple operation of the regular normal service fluid pressure system. Thus, when the vehicle operator desires to release the brakes, he first actuates parking valve 16 to the brakes-off position. Such actuation produces an exhaust of the fluid pressure from chamber 50 through the parking valve 16. To insure against continued engagement of the wedges 71 with rod 33 the vehicle operator then may make a single operation of the application valve 3 delivering fluid pressure at inlet 28 and moving rod 33, more or less rapidly, further toward the brakes-on position, moving a thinner portion of rod 33 between the wedges and thus loosening or separating them from the rod portion 33b. Wedges 71 are then free to move, in response to vibration, or to the action of spring 70b when it is employed, back toward the position illustrated in FIGURE 2.

Thus it will be understood that the structure of the invention provides for a normal brake-operating assembly operable by normal service fluid pressure and, alternatively, an operation of said normal assembly by parking fluid pressure with the simultaneous provision of means for automatically locking said assembly in brakes-on position through the mediacy of said parking fluid pressure. Whether said locked brakes are released by an exhaust of fluid pressure from chamber 50 and a rapid service fluid pressure operation of the normal assembly, with wedges 71 urged outwardly by vibration or by spring 70b, the basic function, structure and nature of the invention remain.

Thus is provided an automatic mechanical locking of the vehicle brakes upon actuation of the parking valve. The resulting brakes-on condition is not dependent upon maintenance of fluid pressure in chamber 50 and is independent of any concern over leaks of any kind in the fluid pressure system which might otherwise, over a period of time, bleed such fluid pressure away from chamber 50. Subhousing 40 is of minimum size and weight and may be attached to a variety of actuators, it being only necessary to provide a suitable rod 33 and fasteners 42 of sufficient length.

Whereas there has been shown and described an operative form of the invention, it should be understood that this showing and description are to be taken in an illustrative or diagrammatic sense only. For example, a more direct engagement of piston 51 with wedges 71 might be employed without departing from the nature and scope of the invention concepts herein. Similarly, locking members 71 and the lock surface of rod 33 could take other suitably engageable configurations without departing from the invention herein. There are many further modifications in and to the invention which will be apparent to those skilled in the art and which will fall within the scope and spirit of the invention. The scope of the invention should, therefore, be limited only by the scope of the hereinafter appended claims.

There is claimed:

1. A brake actuator comprising a housing, a diaphragm dividing said housing, a fluid pressure inlet on one side of said diaphragm, a brake-actuating rod on the opposite side of said diaphragm, a subhousing secured to said housing and surrounding a portion of said rod outwardly of said housing, said rod having a tapered portion movable into said subhousing, locking means positioned in said subhousing for engagement with said tapered rod portion in response to fluid pressure entering said subhousing, a second fluid pressure inlet formed in said subhousing and positioned to deliver fluid pressure thereinto to urge said locking means into engagement with said tapered rod portion.

2. For use with an actuator comprised of a housing, an actuating rod movable in said housing and extending outwardly therefrom and means in said housing for urging said rod outwardly therefrom, a subhousing, said subhousing having a first chamber, a fluid pressure inlet communicating with said chamber, a piston movable in said chamber in response to entry of fluid pressure thereinto, said subhousing having a central passage formed and adapted for reception of said rod outwardly of said housing, locking means positioned in said subhousing for movement into said passage, said locking means being movable into said passage in response to said movement of said piston.

3. For use with an actuator comprised of a housing, an actuating rod movable in said housing and extending outwardly therefrom and means in said housing for urging said rod outwardly therefrom, a subhousing, said subhousing having a first chamber, a fluid pressure inlet communicating with said chamber, a piston movable in said chamber in response to entry of fluid pressure thereinto, said subhousing having a central passage formed and adapted for reception of said rod outwardly of said housing, and locking means positioned in said subhousing for movement into said passage, said locking means being movable into said passage in response to said movement of said piston, said locking means comprising a guide member surrounding said passage and having a conical well therein and a wedge member positioned for movement into said well under urging of said piston to urge said wedge member toward said passage.

4. For use with an actuator comprised of a housing, an actuating rod movable in said housing and extending outwardly therefrom and means in said housing for urging said rod outwardly therefrom, a subhousing, said subhousing having a first chamber, a fluid pressure inlet communicating with said chamber, a piston movable in said chamber in response to entry of fluid pressure thereinto, said subhousing having a central passage formed and adapted for reception of said rod outwardly of said housing, and locking means positioned in said subhousing for movement into said passage, said locking means being movable into said passage in response to said movement of said piston, said actuating rod having a tapered surface movable into said passage during the excursion of said rod in actuating direction, said locking means including a wedge member having a tapered surface movable into said passage for locking engagement with said tapered rod surface.

5. An actuator comprising a housing, a first chamber in said housing, a diaphragm dividing said chamber, fluid pressure inlet means in said housing positioned to deliver fluid pressure to one side of said diaphragm, an actuating rod engaging the opposite side of said diaphragm and extending outwardly from said chamber and said housing, a second chamber in said housing, said rod being movable in said second chamber, a guide member in said second chamber, a lock member slidably engaging said guide member, a lock-actuating element slidable in said second chamber and engaging said lock member, a third chamber in said housing, a piston reciprocal in said third chamber, an abutment carried by said piston and extending into said second chamber for engagement with said element, and a second fluid-pressure inlet formed and positioned in said housing to deliver fluid pressure to said piston.

6. The structure of claim 5 wherein said lock member comprises a plurality of circumferentially positioned wedge elements having an inner tapered surface movable into engagement with said rod.

7. The structure of claim 6 characterized by and including yielding means formed and positioned in said housing for urging said lock member away from locking position and wherein said rod has a tapered surface and a circumferential surface, said circumferential rod surface being positioned in alignment with said lock member when said rod is in brakes-off position, said tapered surface being positioned in alignment with said lock member when said rod is in a brakes-on position.

8. An actuator comprising a brake chamber, a diaphragm dividing said chamber, a fluid pressure inlet positioned to deliver fluid pressure to one side of said diaphragm, an aperture in the end wall of said chamber on the opposite side of said diaphragm, an actuating rod engaging said opposite diaphragm side and extending through said aperture, a subhousing, fastener means securing said subhousing to said chamber end wall and extending through said subhousing, said subhousing having a central passage through which said rod extends, a circumferential guide yieldingly held within said subhousing in floating engagement with the outer surface of said chamber end wall, said guide having a central aperture through which said rod extends and a conical well converging toward said aperture, a plurality of wedge members slidably positioned in said well, piston means in said subhousing for urging said wedge members inwardly of said well, said rod having a tapered surface movable into said well when said rod moves toward brakes-on position, and a fluid pressure inlet in said subhousing positioned to deliver fluid pressure to said piston means.

9. For use with a brake chamber having an actuating rod extending outwardly therefrom, means for locking said rod in said brakes-on position, said means including a subhousing, a central passage in said subhousing for reception of said rod movably therein, a plurality of circumferentially spaced passages paralleling said central passage and formed and adapted for reception of fastener means for securing said subhousing to said brake chamber, said subhousing having an outwardly open annular chamber at one end thereof, an outwardly open annular chamber at the opposite end thereof, a centrally apertured closure plate closing said second annular chamber, an annular piston reciprocal in said second annular chamber, a plurality of circumferentially spaced leg elements secured to said piston and extending into said first annular chamber, a lock member movable into passage to engage said rod therewithin, and a lock guide in said first annular chamber and engaging said lock, said legs having an actuating engagement with said lock member to urge the same along said guide.

References Cited in the file of this patent
UNITED STATES PATENTS

| | | |
|---|---|---|
| 172,934 | Prall | Feb. 1, 1876 |
| 2,044,921 | Swanland | June 23, 1936 |
| 2,119,419 | Clench | May 31, 1938 |
| 2,394,785 | Kindervater | Feb. 12, 1946 |
| 2,485,252 | Almond | Oct. 8, 1949 |
| 2,570,622 | Willis | Oct. 9, 1951 |